US006574794B1

United States Patent
Sarraf (10) Patent No.: US 6,574,794 B1
(45) Date of Patent: Jun. 3, 2003

(54) SYSTEM AND SATELLITE PAYLOAD ARCHITECTURE FOR INTERACTIVE DATA DISTRIBUTION SERVICES

(75) Inventor: Jamal Sarraf, Irvine, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/216,886

(22) Filed: Dec. 18, 1998

(51) Int. Cl.[7] .................................................. H04N 7/20
(52) U.S. Cl. ........................ 725/63; 370/486; 370/487; 370/401; 725/64; 725/65; 725/66; 455/12.1; 455/13.2
(58) Field of Search ................................. 725/121, 123, 725/126, 63, 71; 455/12.1, 13.2; 370/401, 352, 351, 323, 325, 486, 487

(56) References Cited

U.S. PATENT DOCUMENTS

| | | | | |
|---|---|---|---|---|
| 5,594,490 A | * | 1/1997 | Dawson et al. ................ 348/6 |
| 5,625,624 A | * | 4/1997 | Rosen et al. ................ 370/307 |
| 5,875,181 A | * | 2/1999 | Hsu et al. .................... 370/320 |
| 5,884,142 A | * | 3/1999 | Wiedeman .................. 455/12.1 |
| 5,991,279 A | * | 11/1999 | Haugli et al. ............... 370/311 |
| 5,995,726 A | * | 11/1999 | Dillon ................... 395/200.61 |
| 6,072,770 A | * | 6/2000 | Ho et al. ..................... 370/209 |
| 6,134,419 A | * | 10/2000 | Williams .................... 455/6.2 |
| 6,157,621 A | * | 12/2000 | Brown et al. ................ 370/310 |
| 6,175,719 B1 | * | 1/2001 | Sarraf et al. ................ 455/13.1 |
| 6,205,473 B1 | * | 3/2001 | Thomasson et al. ......... 709/217 |
| 6,240,073 B1 | * | 5/2001 | Reichman et al. .......... 370/319 |
| 6,272,317 B1 | * | 8/2001 | Houston et al. ........... 455/13.1 |
| 6,353,930 B1 | * | 3/2002 | Shimoji et al. ............. 725/110 |

* cited by examiner

Primary Examiner—Andrew Faile
Assistant Examiner—Ngoc Vu
(74) Attorney, Agent, or Firm—V. D. Duraiswamy; M. W. Sales (57) ABSTRACT

A satellite payload architecture for interactive data distribution and broadcasting services preferably for use in the emerging EHF (20–60 GHz) frequency bands. The system allows many individual service-program providers to transmit their service-program data to the satellite, on a bandwidth-on-demand and as-needed basis, directly from their premises through low-power, low-cost satellite terminals. The satellite payload utilizes high-gain spot beams for low-cost uplinking, digital regeneration and multiplexing of the individual received service-program data into MPEG transport streams, and broadcasting these in a DVB-compatible format via full-area broadcast beams to very small, low-cost end-user satellite terminals. All end-user satellite terminals are also equipped with transmit capability of a reverse-channel in support of interactivity-communications and network signaling/control functions. The proposed system will provide low-cost interactive data distribution and broadcasting services to thousands of small and large content-providers to reach their target customers.

14 Claims, 5 Drawing Sheets

SYSTEM AND SATELLITE PAYLOAD ARCHITECTURE FOR INTERACTIVE DATA DISTRIBUTION SERVICES

TECHNICAL FIELD

This invention relates to satellite communications and more particularly to a satellite-based communications network and a satellite payload architecture for use in the extremely-high-frequency (EHF) bands.

BACKGROUND ART

In the emerging EHF bands of 20–60 GHz for use in satellite communications, use of traditional bent-pipe repeaters and single-uplink/downlink beams is no longer a viable architecture for systems that need to support the emerging information distribution and interactive broadcasting services targeted to mass markets. For widespread appeal, such systems must allow easy and low-cost access to the satellites by all information content providers, scattered throughout the coverage area, on a bandwidth-on-demand, as-needed basis.

With traditional payload designs, a satellite with a single uplink beam over a relatively large service area has a much lower gain/temperature figure of merit than that of a spot-beam design. For example, a single beam covering the 48 contiguous U.S. states has an edge-of-coverage gain/temperature value of about 0 dB/K. The same area can easily be covered by 100 0.5-degree spot beams each with an edge-of-beam gain/temperature of about 17 dB/K. This means that for uplinking the same information rate to the satellite one requires approximately 17 dB (a factor of 50 times) more radiated power with the single-beam design than with spot-beam designs. Provision of this additional amount of radiated power in the 20–60 GHz frequency bands, coupled with the much higher link margins needed for rain attenuation compared to those required for the lower frequency bands, makes the cost of uplinking too expensive, and operationally not desirable, to many would-be service providers.

A further requirement is the need to downlink wide-band, high-data-rate time-division-multiplexed (TDM) carriers. This allows for use of lowest-cost receive terminals, as well as, dynamic multiplexing of data packets from multiple services at the highest transmission efficiencies. To achieve these benefits with conventional bent-pipe satellite payloads, one has to back-haul the service/program contents from hundreds or thousands of distribution sites to a few designated central uplink sites. This is operationally inconvenient and expensive, and it is not conducive to the development of low-cost information distribution and broadcasting service markets.

SUMMARY OF THE INVENTION

The present invention overcomes the drawbacks of prior art systems through the provision of a new system and satellite payload architecture in support of the emerging interactive information distribution and broadcasting services in the new extremely-high-frequency bands (20–60 GHz). The system allows multiple service-program providers to access the system on a bandwidth-on-demand and on an as-needed basis. Furthermore, the service-program providers can directly transmit to the satellite from their premises through small, low-power, low-cost terminals, to provide a plurality of one-way and interactive information distribution services, including video, to small low-cost user/subscriber terminals on a controlled basis.

The present invention has many advantages over bent-pipe or back-hauled payload designs. The present invention includes such features as: (1) low-cost, individual or "personal" broadcasting terminals, (2) concurrent access to multiple program.(information) channels by a single end-user terminal, (3) return transmission capability for interactive applications, (4) direct transmissions to the satellite by all service-program providers on a bandwidth-on-demand and as-needed basis, (5) elimination of terrestrial backhaul transmission and very expensive uplink facilities at centralized hubs, (6) maximizing satellite transmission efficiency and system throughput, (7) providing maximum flexibility in allocation of uplink access capacity to all parts of the service area, and (8) support of single-hop mesh connectivity for special supplementary services among user terminals.

The new payload employs high-gain spot beams for low-cost uplinking, on-board signal regeneration and processing for transmission efficiency and multiplexing, and full-area broadcast downlink beams essential for wide-area coverage. User/subscriber terminals equipped with transmit capability can directly interact with the service-program providers in support of the emerging interactive Internet and multimedia applications and services. Multiplexing of large amounts of information onto wide-band downlink broadcast TDM carriers enables receive terminals to have concurrent access to multiple information service programs or channels.

Use of on-board data regeneration, processing and multiplexing allows every service-content provider to transmit at its own individual data-rate needs, which usually is much lower than the required TDM rates used for downlinking. The multiplexing function of the payload groups the received information data-packets into one or more TDM streams. The TDM streams are transmitted via a single broadcast beam to achieve optimum networking features, service delivery, and bandwidth utilization efficiency. Use of on-board signal processing further provides for maximum flexibility in access to the broadcast capacity from any location in the service area, thus achieving a substantial improvement in system utilization over the bent-pipe payloads. Use of high-gain uplink spot beams also provides for low-cost return transmissions by the small user terminals throughout the satellite coverage area. Such return transmission capability allows the system to support all types of emerging interactive multimedia and broadcasting services that otherwise would require the use of separate terrestrial return communication channels.

While the proposed system can be implemented with many different transmission technologies, one embodiment, particularly suited for downlink transmissions, is to make the system.as compatible with the emerging MPEG-DVB broadcast standards as possible. This is due to the fact that the MPEG-DVB standards are being adopted worldwide by most of the current generation of direct broadcast satellite systems for video and data distribution services.

Conventional ground-based systems employ the MPEG-2 standard for source encoding and multiplexing, whereby constituent digitized/compressed components of each program or service, such as video, audio and any associated data, are either combined into individual program transport streams or multiplexed with components of several other programs into one composite high-rate TDM transport stream, one per satellite transponder, for final distribution to subscriber terminals. As part of the transport-multiplexing stage, additional program specific information is also added to the transport stream in order for the subscriber terminals to properly access each transport stream and recover the authorized program-data streams. These systems, however, use traditional bent-pipe satellites which require the service-programs to be backhauled to a few ground-based uplink sites for MPEG-DVB processing and multiplexing. The proposed compatibility with MPEG-DVB broadcast standards under this invention should reduce the overall system development cost and result in a much lower cost for the end-user subscriber terminals.

In addition to its general use as an interactive information distribution network, the proposed system architecture can easily be adapted and employed for local-TV program distribution. In such an embodiment, each broadcaster can uplink its programming directly from its premises, through a low-cost terminal, instead of back-hauling the information to a centralized broadcast center as in present systems. When used for such services, because of the local nature of distribution, the satellite payload can be equipped with multiple "local" or "regional" downlink beams for maximum power efficiencies.

The disclosed system architecture also supports direct single-hop connections among low-cost subscriber terminals for low-volume point-to-point communications in support of supplementary services associated with the primary services.

Other advantages of the invention will become apparent upon reading the following detailed description and appended claims, and upon reference to the accompanying drawings.

BRIEF DESCRIPTION OF THE DRAWINGS

For a more complete understanding of the invention, reference should be made to the embodiments illustrated in greater detail in the accompanying drawings described below by way of example of the invention.

DETAILED DESCRIPTION OF THE INVENTION

System Architecture and General Description

Figure 1:
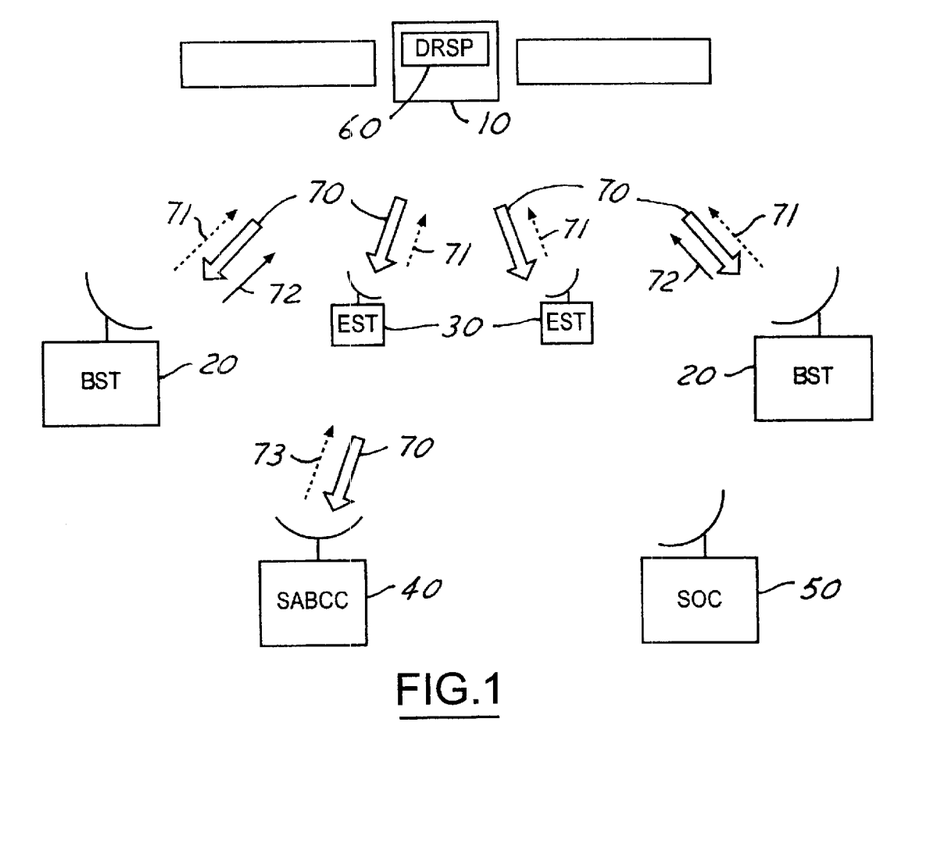
FIG. 1 is a block diagram of the overall satellite communication system according to the present invention.

FIG. 1 illustrates the general make-up and configuration of an interactive broadcast satellite system in accordance with the present invention. The major system elements are: the satellite 10; the satellite operations center (SOC) 50; the satellite access and broadcast control center (SABCC) 40; a plurality of broadcast satellite terminals (BST) 20 and a plurality of end-user satellite terminals (EST) 30. The payload architecture fo satellite 10, including processor 60 will be discussed in greater detail later with reference FIG. 3.

SOC 50 communicates with the satellite 10 for the traditional on-orbit station keeping and satellite telemetry, tracking and control (TT&C) functions.

Every service or program distribution center is equipped with one BST 20 through which individual service-program providers feed their contribution programs to a common broadcast platform in the satellite 10. The satellite payload recovers and multiplexes all individual service-program transmissions into a number of wide-band broadcast data streams 70 for transmission to all terminals in the system. All functions related to (1) network access by service-content distribution centers, (2) reception of and access to individual broadcast service-programs by authorized subscribers, and (3) control and management of system traffic-loading and operations are performed by SABCC 40.

Figure 2:
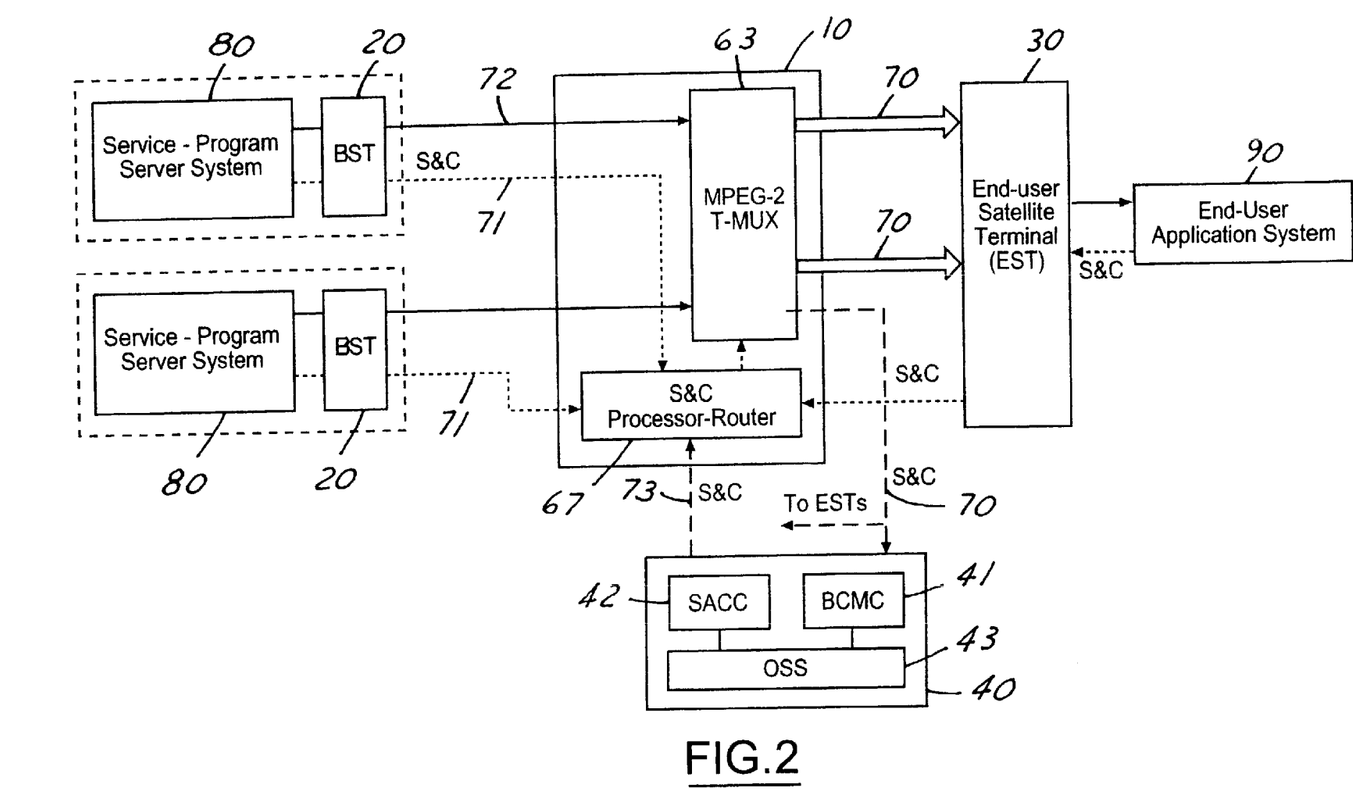
FIG. 2 is a block diagram of the system function architecture and communication pathways of a satellite system according to the present invention.

FIG. 2 illustrates the architecture and functional block diagram of the present system, detailing the logical relationships and interfaces among the various elements. Every service-program distribution center is equipped with a small broadcast terminal (BST) 20 installed directly on its premises.

Program or application content-data residing on server system 80 at the distribution center is delivered to the BST 20, which, after appropriate formatting, uplinks them to satellite 10 under the control of SABCC 40. All such transmissions 72 are recovered by the satellite payload 10 and, after proper processing, the received individual service-program data streams are multiplexed into one of several downlink broadcast streams or channels 70. As part of the multiplexing process, all necessary program-specific information received from SABCC 40 is inserted into each downlink broadcast stream 70. These data carry information about configuration of the network in general, and specific information about how an end-user satellite terminal (EST) 30 may recover every service-program being broadcast. Control-data related to implementation of a conditional-access scheme to authorize access to each broadcast service-program is also included. End-user satellite terminals (ESTs) 30 receive the downlink broadcast channels 70, and, based on the proper authorization, extract the data streams related to all of the service-programs or applications they have subscribed to. As part of their operations, and for network control and management functions, all service-program distribution centers 75 provide their service-specific information to SABCC 40.

In support of interactive broadcast services and network management and control functions, the system relies upon a two-way out-of-band signaling and communications (S&C) capability available to all system elements of interactive multi-media applications.

From a communications point of view, the S&C networking among all the system entities is implemented through the use of connection-less, packet-based Internet-Protocol (IP) networking technologies, with the satellite 10 providing the functions of a network switch/router connecting all system elements together. As such, every system element delivers its S&C IP packets to the payload S&C packet processor-router 67, which in turn forwards each packet to its final destination.

Figure 3:
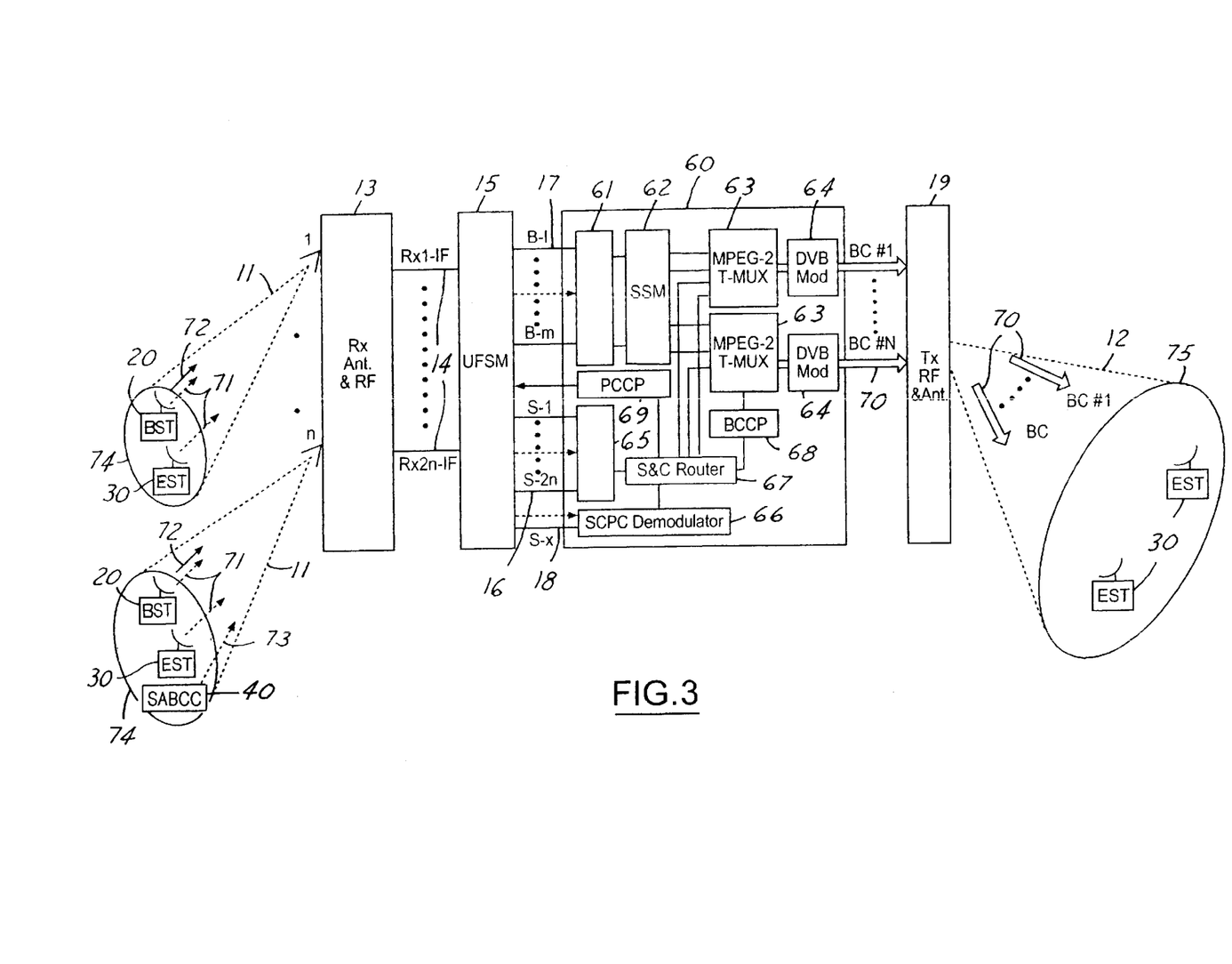
FIG. 3 is a functional architecture and block diagram of the payload and the on-board digital regenerative signal processor of a satellite system of the present invention.

In the uplink direction, EST 30 and BST 20 terminals are equipped with a low-cost CDMA transmit function to uplink their S&C IP packets over any of the pre-designated S&C channels 71. As shown in FIG. 3, these packets are recovered by dedicated S&C demodulators 65 in the payload and given to the S&C packet processor-router 67. Because of its relatively high volume of S&C traffic, SABCC 40 utilizes a dedicated transmission channel 73 to the satellite and the S-x/SCPC Demodulator 66.

In the other direction of traffic flow, the S&C packets are downlinked from the satellite in two ways. All S&C IP packets addressed to ESTs 30 and BSTs 20 are multiplexed onto the downlink broadcast channels 70, along with the primary service-program contents. Through this technique, 20 ESTs 30 can use the same single receiver, for the lowest cost, to extract the S&C packets. Again, because of the relatively high volume of traffic to SABCC 40, and the BSTs 20, a dedicated logical-channel on one of the downlink broadcast carriers 70 is used for sending the S&C packets that are addressed to them.

Known transmission technologies are employed by BSTs 20 and ESTs 30 for their uplink transmissions to the satellite. For uplink broadcast transmissions by BST terminals 20, frequency-division-multiple-access with single-channel-per-carrier (FDMA/SCPC) is used as a preferred technique to achieve optimum bandwidth efficiency and satellite payload implementation. For S&C transmissions by ESTs, because of the strong desire to keep their costs as low as possible, and the fact that such terminals need only transmit relatively short S&C messages, use of code-division-multiple-access (CDMA) is the preferred technique. In addition to being a simpler and more efficient random-access technique, CDMA flexibly supports simultaneous transmissions by different EST 30 terminals at different rates, all within a chosen operating range.

Satellite Payload Architecture

FIG. 3 illustrates the satellite 10 payload architecture of an interactive broadcast satellite system according to the present invention. In the uplink direction, the total target service area is covered by a relatively large (n) number of foot-prints or spots 74. Each spot 74 is served by one high-gain communication spot-beam 11 per frequency-polarization, for a total of 2n spot beams per satellite. In the downlink direction, two broadcast beams 12, one per frequency-polarization, provide downlink coverage to the same total service area 75. The high-gain uplink spot beams 11 are needed to support small low-power, low-cost broadcast earth station terminals (BSTs) 20 as explained earlier.

The satellite payload principally comprises: (1) a receive spot-beam antenna and RF-electronics subsystem 13 for with 2n spot-beams and 2n receive strings; (2) one uplink-frequency-subband filter-switch-matrix (UFSM) 15 with 2n input ports, each handling one spot-beam receive intermediate-frequency (Rx-IF) signal 14; (3) one digital regenerative signal processor (DRSP) 60, with 2n S-type input ports 16 (labeled S-1, ... S-2n), m B-type input ports 17 (labeled B-1, ... B-m) and one S-x-type input port 18 (labeled S-x); and (4) a transmit RF-electronics and antenna subsystem 19 for downlink broadcast transmissions.

In every spot or foot-print 74, every broadcast terminal (BST) 20 directly transmits its service-program data-streams via certain FDMA/SCPC channels 72 in designated uplink frequency sub-bands to the satellite. After reception by a spot-beam receiver, UFSM 15 selects the active sub-bands from each received IF signal and passes them to one of m B-type input-ports 17 (for broadcast-traffic) of DRSP 60 for further processing. DRSP 60 demodulates the incoming carriers, recovers the individual service data-streams and multiplexes them into N downlink broadcast channels 70 (BC#I–N).

All transmissions by BST 20 and EST 30 terminals in support of interactivity-communications and network signaling/control functions (S&C) are made via special access CDMA channels 71 in each spot-beam 74. To provide total service-area coverage for S&C transmissions in the uplink direction, the UFSM 15 separates the sub-band allocated for such S&C traffic from each beam's IF signal and delivers them to the S-type input-ports 16 of DRSP 60. After recovery by CDMA demodulators 65, S&C packets are given to the S&C packet processor-router 67 for routing to appropriate destinations. These include the payload configuration control processor 69, the broadcast-channel control processor 68 and the multi-service MPEG-2 transport multiplexers 63. S&C packets from SABCC 40 are transmitted via dedicated channels 73, recovered by S-x/SCPC demodulator 66, and are given to S&C packet processor-router 67. All S&C traffic destined for ESTs and BSTs are multiplexed onto the downlink broadcast channels 70 along with the main service-program traffic. End-user satellite terminals (EST) 30 can receive any one of the broadcast channels 70 (BC #I to BC #N) and recover the service-program contents they are authorized for.

Other key subsystems of the DRSP 60 are: one stream-switch-matrix (SSM) 62, a plurality of muti-service MPEG-2 transport multiplexers 63, a plurality of DVB modulators 64, a payload-configuration-control-processor (PCCP) 69, and a broadcast-channel control-processor (BCCP) 68. SSM 62, under control of SABCC 40, connects the individual broadcast MPEG service streams received from the DVB demodulators 61 to the appropriate multi-service MPEG-2 transport multiplexers 63. The primary function of the PCCP 69 is the reception and execution of configuration commands, from SABCC 40, for UFSM 38 and the SSM 62. Function of BCCP 68 is the reception of service-program specific information generated by the broadcast-channel management center 42 of SABCC 40. The required specific information is defined by the MPEG-2 standard and includes program association, program map, conditional access, and network information tables. The BCCP 68 delivers this specific information to the appropriate multi-service. MPEG-2 transport multiplexer 63.

Satellite Access and Broadcast Control Center (SABCC) As described earlier, SABCC 40 is the system entity that manages and controls the overall functioning of the proposed system. The key functional areas of SABCC 40 are shown in FIG. 2 and include the following: a satellite access-control center (SACC) 42, a broadcast-channel management center (BCMC) 41, and an operations support system (OSS) 43.

SACC 42 is responsible for the usage and management of all of the uplink transmission channels transmitted by each broadcast satellite terminal (BST) 20. Each BST 20 contacts SACC 42 to receive an uplink channel assignment for a given duration. A. BST 20 sends a request message to SACC 42, over an S&C channel 71, for an uplink access for a certain bandwidth and duration. SACC 42, after authentication of the BST, assigns a FDMA/SCPC channel, from the pool of frequencies for the spot beam in which the BST 20 is located, to handle the requested transmission rate/bandwidth. After completion of its broadcast transmissions, the BST informs SACC 42 and stops its transmissions. SACC 42 returns the freed channel to its pool of frequencies for assignment to the next requester.

BCMC 41 is responsible for the control and management of all the functions called for and identified by the MPEG-2 transport protocols that will help the system users access and retrieve the program contents they subscribe to. These include: creation of the network information tables, the program association tables, the conditional access tables, etc. These information will be transmitted to the satellite broadcast-channel control processor 68 for final multiplexing and inclusion in the MPEG transport streams 70 by multiplexers 63. Most of these service-program specific information is collected from the service-program providers prior to their uplink transmission activities. EST 30 owners, after registering into the system, and who wish to receive any of the broadcast service-programs will make their selections from an electronic service-program guide in the same manner as that of the pay-per-view systems of the video broadcast industry.

Depending on the business model existing between the satellite system operator and each individual service-program provider, the identity of each subscriber/end-user, its geographic location, service privilege profile, and the I.D. of its EST need to be provided, by the responsible party, to BCMC 41 for incorporation into the appropriate functions. The contractual "service provider" also operates its own subscriber management system in terms of billing, marketing, etc. In this manner, the satellite system operator can act as either the service provider or the provider of distribution/transmission services to many independent primary service-content providers as best suitable for each.

OSS 43 is the collection of all functions required to operate and manage the overall system. As a minimum, these functions cover both the technical, administrative and customer care areas for the satellite operator. Distribution of EST 30 and BST 20 terminals, and their installation and commissioning into the system, are in general arranged by the satellite system operator.

Broadcast Satellite Terminal (BST)

Figure 4:
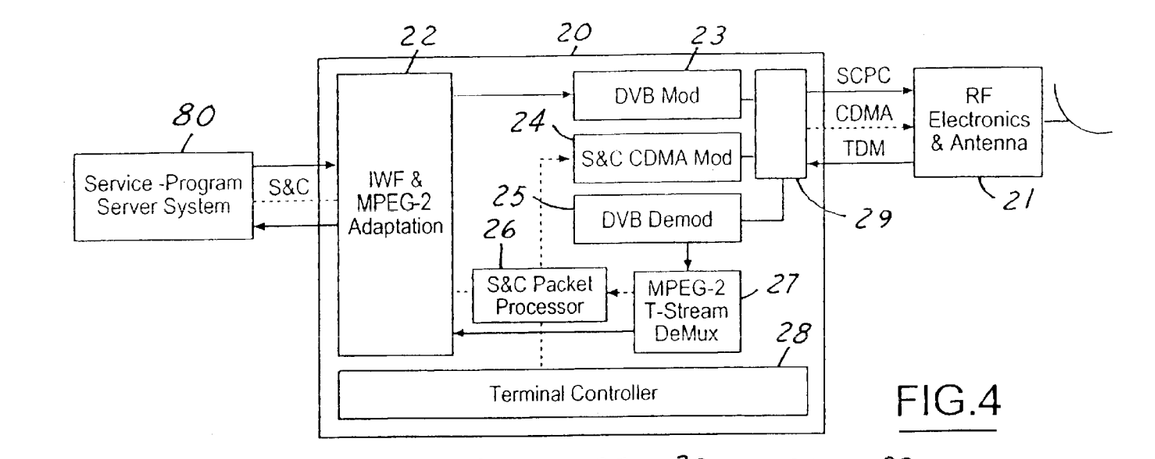
FIG. 4 is a functional, block diagram of a broadcast satellite terminal of a satellite system of the present invention.

With FIG. 2 as the reference diagram, FIG. 4 illustrates the functional architecture of a broadcast satellite terminal (BST) 20 for use in the proposed system. BST terminals 20 are colocated with server system 80 at the service-program distribution centers 75 for direct transmission of the service-program material to satellite 10. In addition, BSTs 20 are equipped with a transmit and receive capability, and, consequenlty are able to communicate with end-user terminals (EST 30) and the system access and broadcast control center (SABCC 40) for interactivity-communications and for signaling/control (S&C) functionalities. The major functional entities of a BST 20 are described below.

An inter-working-function and MPEG-2 service-program adaptation unit 22 accepts the primary service-program from the service-program server 80 at a distribution center, converts and formats the data into an MPEG-compatible service stream 22A, and delivers this stream to a DVB modulator unit 23. This interface unit 22 also provides the necessary inter-working functions for S&C related functions as well.

A DVB-modulator 23 formats the data stream received from unit 22 into DVB-packets and performs the basic channel coding and modulation selected for the uplink transmissions.

An S&C packet processor 26 handles the S&C IP packet transmission and reception functions. In the transmit direction this unit encapsulates the relevant S&C messages, received from the service-program server system 80, or from the terminal controller 28, into IP data packets. These IP packets are then passed to a CDMA modulator unit 24 for onward transmission to satellite 10.

A DVB-demodulator 25, in tandem with an MPEG-2 Transport-stream demultiplexer 27 receives and recovers the downlink S&C channel 73 carried over a pre-designated broadcast TDM channel. These S&C data packets are given to packet processor 27 for further processing. Availability of this DVB demodulator unit enables the BST 20 operators to receive and monitor their own transmissions.

An intermediate-frequency interface unit (IFL) 29, in conjunction with a two-way RF electronics and antenna unit 22, perform the other key functions of the BST 20. A terminal controller unit 28 performs the overall management and control of the various functions of BST 20.

End-user Satellite Terminal (EST)

Figure 5:
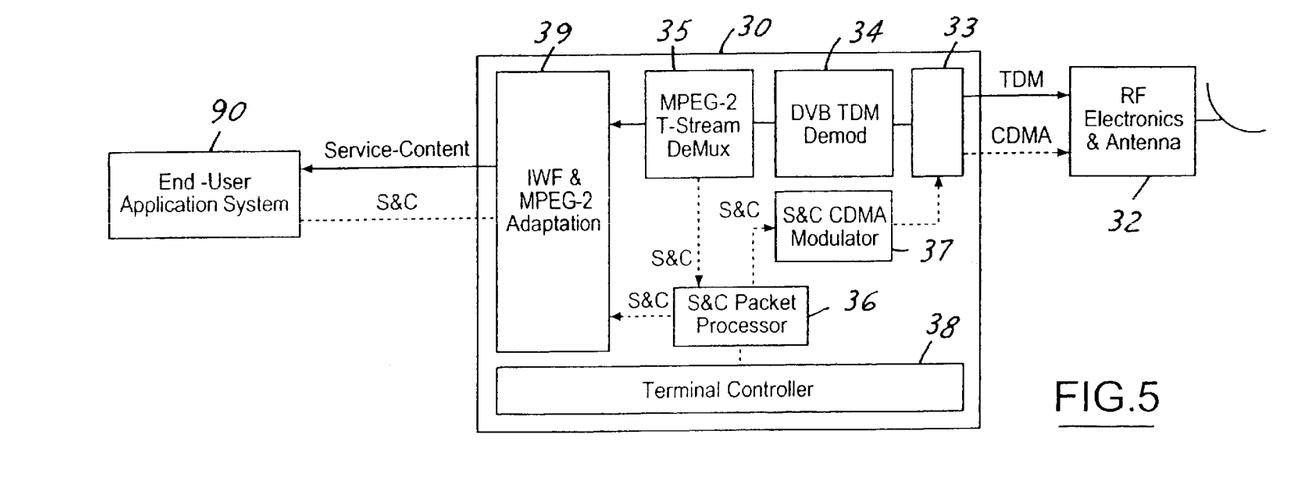
FIG. 5 is a functional block diagram of an end-user satellite terminal of a satellite system of the present invention.

With FIG. 2 as the reference diagram, FIG. 5 shows the functional architecture of an end-user satellite terminal (EST) 30 for use in the proposed system. ESTs 30 are located at the end-user sites for direct reception of the service-program material from the satellite 10. In addition, ESTs 30 are equipped with a reverse-channel transmit capability and, consequently are able to communicate with broadcast terminals (BST 20) and the system access and broadcast control center (SABCC 40) for interactivity-communications and signaling/control functionalities. The major functional entities of an EST 30 are described below.

In the receive direction from satellite 10, an RF electronics and antenna out-door unit 32 receives the satellite broadcast transmissions 70 and converts them to corresponding IF signals. The received IF signals are then passed over an inter-facility link (IFL) to an IFL interface unit 33.

A DVB TDM demodulator 34 recovers the broadcast MPEG-2 service transport stream from each of the received IF signals. An MPEG-2 transport stream demultiplexer 35 extracts the selected service-program stream, selected by the end-user, from the associated transport stream. This demultiplexer 35 also separates the incoming S&C data packets for delivery to the S&C packet processor unit 36.

An inter-working-function and MPEG-2 service-program adaptation unit 39 performs the final conversion and formatting of the selected service-program content for delivery to the end-user application system 90.

An S&C packet processor 36 receives and distributes the incoming S&C IP packets to their appropriate recipients. A terminal controller unit 38 performs the overall management and control of the various functions of the EST 30.

SYSTEM IMPLEMENTATION

Implementation of the present system and payload architecture follows general system design and engineering principles applicable to all satellite communication systems. The architecture is such that specific details of system design and configuration can be customized to meet the overall business, services and operations requirements of different markets. As usual, the state of satellite and related communications technologies at the time of system implementation will influence the actual design details and configurations. Accordingly, the following implementations provide an embodiment of the present invention which is an exemplary satellite payload design representative of the first generation of bandwidth-on-demand, interactive broadcast satellite systems in the EHF frequency bands.

System Frequency and Channelization Plan

With FIG. 3 as the system reference diagram, FIG. 6 illustrates a baseline frequency and channelization plan for the present system. The total system service area is divided into n uplink foot-prints or spots. Every spot can be served by two uplink beams, one on each polarization, for a total of 2n beams. As shown in FIG. 6(a), in the uplink direction, the primary frequency spectrum (PFS) of each polarization is divided into a number of K, preferably equal, segments called uplink frequency sub-bands (UFS). The size of the UFS is generally dictated by the input port capacity of the satellite's on-board digital regenerative signal processor (DRSP) 60 and is chosen as a compromise between complexity-size considerations for the payload DRSP 60 and the UFS filter-switch-matrix (UFSM) 38 assemblies on one hand and the system bandwidth-utilization efficiency on the other.

Figure 6A:
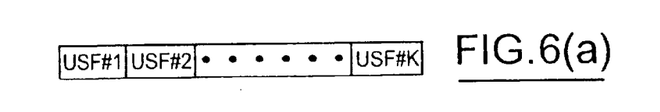
FIG. 6 is an exploded view of the frequency and channelization plan of a satellite system of the present system.
Figures 6B, 6C:
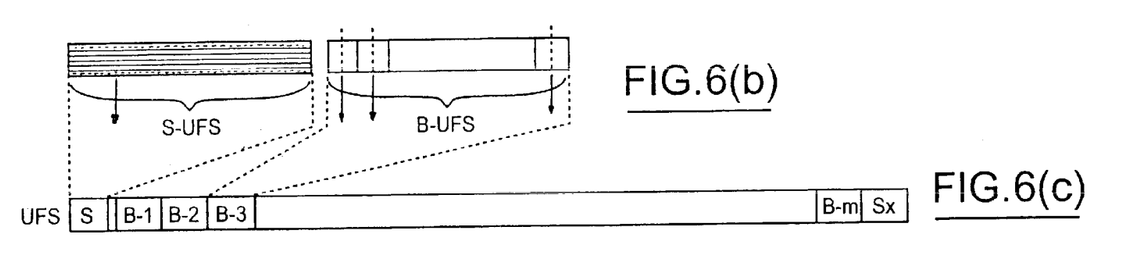
Figure 6D:
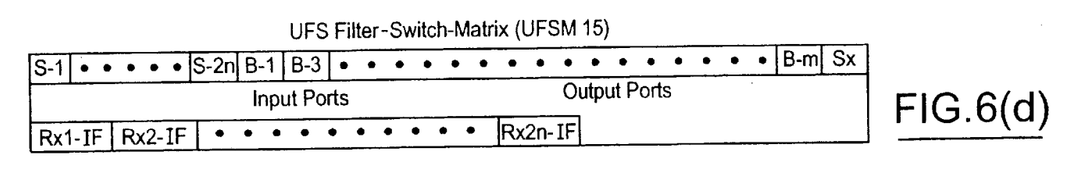

As shown in FIG. 6(b), two types of UFS bands are defined. S-UFS band is used for uplink S&C transmissions. B-UFS bands are used for uplink broadcast transmissions. As mentioned earlier, as a preferred embodiment, CDMA and SCPC are chosen for uplink S&C and broadcast transmissions, respectively. As shown in FIG. 6(c), a single S-UFS band is assigned to all uplink spot beams for S&C transmissions. As shown in FIGS. 3 and 6(d), the receive IF signal (Rx1-IF, . . . Rx2n-IF) from each uplink spot-beam is connected to an input-port of UFSM 15. On the output side, UFSM 15 needs to have 2n ports, each supporting one S-UFS, and m ports each supporting one B-UFS subband. Thus, there is a one-to-one correspondence between the number of UFSM 15 output-ports and the number of DRSP 60 input-ports. For example, assuming a value of 500 MHz for the primary spectrum PFS, and 25 MHz for each uplink frequency subband, a total of 20 unique uplink frequency subbands are available for each polarization.

Referring again to FIG. 6(a), each uplink frequency sub-band (UFS), numbered 1 through K, can be assigned to any given uplink spot-beam according to a frequency-assignment plan chosen for the system. Employing a typical 4-beam per frequency-reuse cluster design easily achievable by most EHF satellite antenna systems, every UFS band can be reused in each polarization once in every beam-cluster for a total of n/2 per system. Assignment of UFS bands to spot beams is managed and controlled by the SABCC 40 in support of the total system traffic loading demands at any time. When required, each spot-beam can be assigned up to the maximum number of B-UFS bands as long as the frequency-reuse constraints and rules for all beams are observed. Each B-UFS band is also divided into a number of FDMA/SCPC carriers, each assigned by SABCC 40 to a broadcast terminal on a demand-assigned basis.

In the uplink direction a minimum of one S-UFS band is assigned to every spot beam. Because of the characteristics of CDMA, the same single S-UFS band can be reused in all beams. At the satellite, the UFSM 15 selects the S-UFS band from every spot beam receive IF signal (Rx-IF) and passes each to a corresponding DRSP 60 S-type input-port. (See FIGS. 6(d) and 6(e)).

To support service-program uplink transmissions, the available B-UFS bands are assigned to each spot beam on an as-needed basis depending on the activity of all broadcast terminals in each beam. This is done under the SABCC 40 control and subject to the system frequency-assignment rules and restrictions as described earlier.

Figure 6E:
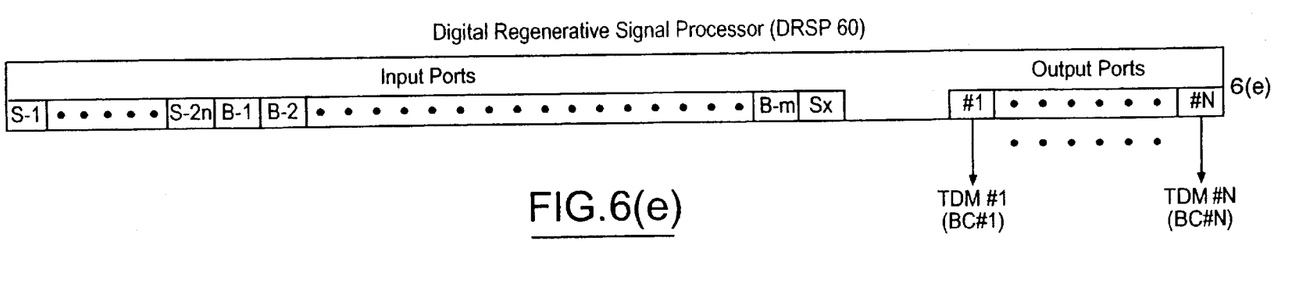

As shown in FIG. 6(e), in the downlink direction, the primary frequency spectrum of the system will be divided into a number of broadcast channels (BC#I . . . BC #N) according to the system design requirements. Each broadcast channel carries a single TDM transport stream. To provide the maximum capacity per satellite, both frequency-polarizations are used for the downlink transmissions. As an example, 20 27-MHz broadcast channels can be supported in a 500-MHz portion of the spectrum of a given satellite system on each polarization, for a total of 32 TDM channels per satellite. The exact transmission capacity of each TDM channel depends on the selected parameters for the DVB modulators 64 and the downlink availability performance requirements.

Uplink-Frequency-Subband Switch Matrix (UFSM) & Digital Regenerative Signal Processor (DRSP): Configuration and Sizing Recovery of all data-packets transmitted to the satellite, both service and S&C related, and grouping of them into downlink broadcast TDM channels is performed by the combination of the payload uplink-frequency-subband filter switch matrix (UFSM) 15 and on-board digital regenerative signal processor (DRSP) 60. All service-program uplink transmissions are carried via SCPC channels. Preferably three rates, one each for low-medium-, and high-data rate applications, are employed. Peak rates of 0.5 Mbps and 10 Mbps are good candidates to meet the low-cost objectives for the BSTs. At such rates, every B-UFS band can accomodate several of these carriers in a mixed mode.

Since the system is a bandwidth-on-demand service network, it is expected that many uplink frequency subbands (UFS) assigned to uplink beams will not be filled with carriers at all times. Thus, it is desirable to ensure that the downlink broadcast capacity, which is the key revenue-bearing resource of the system, is not under-utilized because of partially-filled uplink B-UFSs.

To maximize downlink broadcast capacity, several factors must be considered. First, uplink spectrum bandwidth is assigned to each spot beam in multiples of whole-UFS bands. For CDMA transmissions in support lo of network signaling and interactivity-communication (S&C) functions, one primary UFS band is assigned to, and reused in, all spot beams. For broadcast transmissions, a whole UFS band should be allocated to a beam for the duration of a BST's transmissions, even if only one terminal in a spot beam is to be active. Further, the size and complexity of the on-board digital regenerative signal processor (DRSP) 60 is heavily influenced by the bandwidth and number of the input ports which it must support.

A UFS band connected to one input port of the DRSP 60 requires a certain amount of DRSP processing resources regardless of the number of carriers active in that UFS. Thus, if the aggregate amount of service-program data-packets recovered from all of the carriers processed by the input ports do not completely fill the available plurality of downlink broadcast TDM streams for which the DRSP is sized, then, the satellite and its broadcast throughput will not be fully utilized. Since the downlink frequency spectrum is the limiting factor in determination of maximum capacity of a system, the proper sizing of the UFS filter-switch-matrix (UFSM) 15 and the DRSP 60 ports, in terms of quantity and bandwidth, is a critical consideration.

Accordingly, the number and bandwidth of UFSM 15 output ports and DRSP 60 input ports should be chosen such that the payload can handle a much larger number of B-UFS bands than the number needed to fill the downlink broadcast capacity purely on a bandwidth basis. This provides flexibility in meeting the varying and unpredictable traffic loadings from various spot beams during the life of the system while maximizing the utilization of the system. Of course, the actual sizing of UFSM-DRSP combination must be determined with regard to these parameters in the context of specific system implementation.

Broadcast Channel Sizing

The choice of the exact number of service-programs per TDM transport stream and the final modulation rate is made based upon the specific satellite downlink transmit channel characteristics and coverage beams for each implementation.

The choice of uplink and downlink transmission rates and channel coding details are made for each implementation on a case by case basis, and per business and quality-of-service performance requirements. Additionally, if compatibility with an existing video-DBS system is a requirement, then, the downlink TDM channels of the new system will have to be fully compatible with the target DBS air-interface specifications.

MPEG-DVB Compatibility Benefits

Benefits of an MPEG-DVB-compatible architecture for the proposed interactive data distribution and broadcasting satellite system, in accordance to this invention, are many. Compatibility with a worldwide standard used in millions of consumer terminals will preferably result in the lowest-cost implementation for the system and end-user/subscriber terminals, resulting in wide-acceptance of the services offered. Additionally, use of embedded and field-proven conditional-access systems, network and electronic program guides, and subscriber management systems, already developed for the existing ground-based, MPEG-DVB compatible, direct broadcast satellite systems, will substantially lower the implementation and operational costs such systems.

While this invention has been described in connection with one embodiment, it is understood that the invention is not limited to that particular embodiment. On the contrary, the invention includes all alternatives, modifications, and equivalents as may be included within the spirit and scope of the appended claims.

What is claimed is:

1. An interactive data distribution and broadcasting satellite system comprising:
   at least one satellite configured to receive service-program data transmissions and process and broadcast the service-program data transmissions as wide-band broadcast channels;
   at least one broadcast satellite terminal (BST) associated with a respective at least one service-program provider for uplinking the service-program data transmissions to said satellite;
   at least one end-user satellite terminal (EST) for receiving the broadcast channels from said satellite; and
   a satellite access and broadcast control center (SABCC) for controlling the uplinking of the service-program data transmissions of said at least one broadcast terminal,
   wherein said at least one EST terminal and at least one BST terminal each include a reverse channel for transmission of network signaling and interactive-communications (S&C) data packets to said satellite, said S&C data packets are internet-protocol (IP) packets, and said service-program data transmissions from said at least one BST terminal to said satellite are single-channel-per-carrier (SCPC) transmissions.

2. The broadcast satellite of claim 1 wherein the service-program data transmissions from said at least one BST terminal to said satellite are single-channel-per-carrier (SCPC) transmissions.

3. The broadcast satellite system of claim 1, wherein the reverse channel S&C data packet transmissions from said at least one EST terminal are code-division-multiple-access (CDMA) transmissions.

4. The broadcast satellite system of claim 1 wherein broadcast transmissions from said satellite are compatible with MPEG-2 DVB standards.

5. The broadcast satellite system of claim 1 wherein said satellite further comprises:
   a receive antenna and radio-frequency electronics subsystem comprising receivers for receiving uplinked transmissions from said at least one BST and EST terminals;
   an UFS filter-switch-matrix having a plurality of input ports and a plurality of output ports, each input port being in operative communication with a respective receiver, which separates said uplinked transmissions into a plurality of broadcast subbands (B-UFS bands) and S&C sub-bands (S-UFS bands) and switches said B-UFS and S-UFS bands to said plurality of output ports;
   a digital regenerative signal processor (DRSP) subsystem connected to said UFS filter-switch-matrix;
   a transmit antenna and radio-frequency electronics subsystem comprising up-converters, amplifiers and downlink antennas for downlinking the broadcast channels to said at least one EST terminal.

6. The broadcast satellite system of claim 5, wherein spot beams are used for uplinked transmissions from said at least one BST and EST terminals.

7. The broadcast satellite system of claim 6, wherein transmissions in the B-UFS bands are SCPC transmissions and the transmissions in the S-UFS bands are CDMA transmissions.

8. The broadcast satellite of claim 7, wherein said digital regenerative signal processor comprises:
   a plurality of broadcast-input ports each adapted to receive a plurality of SCPC transmissions from said at least one BST terminal;
   a plurality of DVB demodulators, each connected to a respective one of said plurality of broadcast-input ports for recovering service-program data associated with each SCPC transmission;
   a plurality of S-input ports each adapted to receive CDMA transmissions from said at least one EST terminal;
   a plurality of CDMA demodulators, each connected to a respective one of said plurality of S-input ports for recovering S&C data associated with the CDMA transmissions;
   a stream-switch-matrix having a plurality of input ports for receiving the data streams from said plurality of DVB demodulators and a plurality of output ports to which the data streams are routed;
   a plurality of multi-service MPEG-2 transport multiplexers having a plurality of input ports for receiving data streams from respective ones of said plurality of output ports of said stream-switch-matrix;
   a packet processor-router for receiving and distributing the S&C data packets from and to other components of said satellite, and to said at least one EST and BST terminals;
   a payload configuration-control processor (PCCP) operatively connected to said SABCC for configuring said satellite in response to control signals from said SABCC;
   a broadcast-channel control processor (BCCP), operatively connected to said SABCC, which receives service-program-specific information tables and other information associated with each MPEG-2 transport stream, and sends control signals to said plurality of multi-service MPEG-2 transport multiplexers,
   wherein each one of said plurality of multi-service MPEG-2 transport multiplexers is adapted to multiplex the plurality of data streams received from said streamswitch-matrix, S&C data packets received from said packet processor-router, and control signals received from said BCCP into a plurality of MPEG-2 transport streams; and a plurality of DVB-compatible modulators each adapted to receive a single MPEG transport stream from a respective one of said plurality of MPEG-2 multi-service transport multiplexers, convert the transport stream into a modulated intermediate-frequency signal and deliver the modulated intermediate-frequency signal to said transmit radio-frequency electronics & antenna subsystem of said satellite for downlinking as broadcast channels.

9. The broadcast satellite system of claim 1 wherein the primary operating uplink frequency-spectrum in each polarization is divided into a plurality of uplink frequency sub-bands (UFS) wherein (a) a plurality of said UFS are dynamically assigned on a demand-basis to each uplink spot-beam for SCPC broadcast transmissions to said satellite in accordance to system frequency-reuse constraints, and (b) at least one single UFS is assigned and reused in all uplink spot-beams for S&C CDMA transmissions from EST and BST terminals to said satellite, and (c) an appropriately-sized SCPC in one of the broadcast UFS is assigned for uplink S&C transmissions from SABCC to said satellite.

10. The broadcast satellite system of claim 1 wherein each end-user satellite terminal EST comprises:

an RF electronics and antenna subsystem adapted to receive a plurality of broadcast TDM carriers on each polarization from said satellite to convert said carriers to corresponding intermediate frequency (IF) signals, and (b) to convert IF signals comprising reverse-channel S&C CDMA transmissions to required RF frequency and power for transmission to said satellite;

a DVB demodulator adapted to recover a plurality of broadcast MPEG-2 transport streams from said IF signals;

a MPEG-2 transport-stream demultiplexer to recover (a) a plurality of individual service-program data streams associated with a plurality of broadcast channels selected by an end-user, and (b) a plurality of S&C data packets addressed to said EST terminal, an IP-packet processor-router for distribution of incoming and outgoing S&C data packets;

a service-program adaptation unit to (a) convert, in the receive direction from the satellite, the service-program data recovered by said demultiplexer, and the S&C data packets from said IP-packet processor-router, to a format required by the end-user application system; and (b) deliver in the transmit direction to the satellite, any S&C IP-packets coming from the end-user to said IP-packet processor-router for transmission to said satellite; and a terminal control unit to manage and control the overall operation of said EST.

11. The broadcast satellite system of claim 1 wherein each broadcast satellite terminal BST comprises:

a service-program adaptation unit to (a) convert, in the transmit direction to the satellite, the service-program data received from the service-program server system into a MPEG-2 compatible stream, and any S&C data packets from the service-program server system into S&C IP-packets; and (b) in the receive direction from the satellite, to recover S&C data from IP-packets coming from said SABCC or any EST end-user application system, into a suitable format;

a DVB modulator unit to convert the MPEG-2 compatible stream from said service-program adaptation-unit to a modulated IF signal;

an IP-packet router for distribution of incoming and outgoing S&C IP-packets;

a DVB demodulator unit;

an MPEG-2 demultiplexer unit adapted to recover (a) S&C data packets addressed to said BST and (b) BST service-program for monitoring purposes;

a CDMA modulator for transmission of S&C data packets to said satellite;

an RF electronics and antenna unit adapted to convert the IF signal received from said DVB and CDMA modulator to required RF frequency and power for transmission to said satellite, and to convert a plurality of broadcast TDM carriers from said satellite to corresponding IF signals;

a TDM demodulator, and a terminal control unit to manage and control the overall operation of said BST terminal.

12. A method for interactive data-distribution using a satellite, comprising the steps of:

transmitting internet-protocol (IP) packets to said satellite using CDMA transmissions from at least one broadcast satellite terminal (BST) and at least one end-user satellite terminal (EST);

transmitting dedicated single-channel-per-carder (SCPC) transmissions between said satellite and broadcast control center (SABCC); and processing said IP packets onboard the satellite, Including recovering, routing and multiplexing onto a plurality of downlink broadcast time-division-multiplexed TDM carriers and transmitting said TDM carriers to the EST and BST terminals and the SABCC.

13. The method of claim 12 wherein the primary operating uplink frequency-spectrum in each polarization is divided into a plurality of uplink frequency subbands (UFS bands) wherein (a) a plurality of said UFS bands are dynamically assigned on a demand-basis to each uplink spot-beam for SCPC broadcast transmissions to said satellite in accordance to system frequency-reuse constraints, and (b) at least one single UFS band is assigned and reused in all uplink spot-beams for S&C COMA transmissions from EST and BST terminals to said satellite, and (c) an appropriately-sized SCPC in one of the broadcast UFS bands is assigned for uplink S&C transmissions from SABCC to said satellite.

14. A method for interactive data distribution using a satellite, comprising the steps of:

transmitting service-program data transmissions from at least one broadcast satellite terminal (BST) to a satellite;

processing the service-program data transmissions onboard the satellite;

broadcasting the service-program data transmissions as wide-band broadcast channels to at least one end-user satellite terminal (EST); and transmitting reverse channel network signaling and interactive-communication (S&C) data packets from at least one EST and at least one BST, to said satellite, wherein said S&C data packet transmissions are code-division-multiple access (CDMA) transmissions, and said S&C data packets are internet-protocol (IP) packets, and wherein said service-program data transmissions are single-channel-per-carrier (SCPC) transmissions.

* * * * *